(12) United States Patent
Huang et al.

(10) Patent No.: US 7,330,221 B2
(45) Date of Patent: Feb. 12, 2008

(54) THIN FILM TRANSISTOR ARRAY SUBSTRATE AND REPAIRING METHOD THEREOF

(75) Inventors: Wei-Kai Huang, Tainan (TW); Yi-Jen Chen, Tainan (TW); Chen-Shun Tsai, Taipei (TW); Chiung-Pin Wang, Changhua (TW)

(73) Assignee: Au Optronics Corporation, Hsinchu (TW)

( * ) Notice: Subject to any disclaimer, the term of this patent is extended or adjusted under 35 U.S.C. 154(b) by 527 days.

(21) Appl. No.: 10/906,710

(22) Filed: Mar. 3, 2005

(65) Prior Publication Data
US 2006/0146215 A1 Jul. 6, 2006

(30) Foreign Application Priority Data
Jan. 6, 2005 (TW) .............................. 94100331 A

(51) Int. Cl.
*G02F 1/1333* (2006.01)
*G02F 1/136* (2006.01)

(52) U.S. Cl. .............................. 349/54; 349/42; 349/43
(58) Field of Classification Search .................. 349/54, 349/42, 43
See application file for complete search history.

(56) References Cited

U.S. PATENT DOCUMENTS

| | | | | |
|---|---|---|---|---|
| 6,300,996 B1 * | 10/2001 | Matsuyama et al. | ........ | 349/144 |
| 6,833,882 B2 * | 12/2004 | Lee | .............................. | 349/43 |
| 6,950,167 B2 * | 9/2005 | Matsumoto et al. | ......... | 349/141 |
| 7,015,548 B2 * | 3/2006 | Song et al. | .................. | 257/347 |
| 7,110,056 B2 * | 9/2006 | Matsui et al. | .................. | 349/38 |
| 7,139,043 B2 * | 11/2006 | Kwon et al. | .................. | 349/39 |
| 7,193,664 B2 * | 3/2007 | Liu et al. | ....................... | 349/54 |
| 7,206,054 B2 * | 4/2007 | Kim | ........................... | 349/144 |
| 2005/0264722 A1 * | 12/2005 | Choi | .......................... | 349/110 |
| 2007/0159571 A1 * | 7/2007 | Yang | ........................... | 349/54 |

* cited by examiner

*Primary Examiner*—Mike Qi
(74) *Attorney, Agent, or Firm*—Jianq Chyun IP Office

(57) ABSTRACT

A thin film transistor array substrate and a repairing method thereof are provided. The thin film transistor array substrate comprises a substrate, plural scan lines, plural data lines, plural common lines, and plural pixels. The scan lines and the data lines are disposed over the substrate and define plural pixel areas. Each pixel is disposed in one of the pixel areas corresponding thereto. Each pixel comprises a thin film transistor, a pixel electrode, a top electrode, and a conductive line. In each pixel, the thin film transistor is coupled to the corresponding scan line and the corresponding data line, and the pixel electrode is disposed over the corresponding common line. Furthermore, the top electrode is disposed between the corresponding pixel electrode and common line, and the conductive line is disposed out of the corresponding common line and coupled between the corresponding top electrode and pixel electrode.

34 Claims, 11 Drawing Sheets

B-B'

2

THIN FILM TRANSISTOR ARRAY SUBSTRATE AND REPAIRING METHOD THEREOF

CROSS-REFERENCE TO RELATED APPLICATION

This application claims the priority benefit of Taiwan application serial no. 94100331, filed on Jan. 6, 2005.

BACKGROUND OF THE INVENTION

1. Field of the Invention

The present invention relates to an active device array substrate and a repairing method thereof, and more particularly, to a thin film transistor array substrate and a repairing method thereof.

2. Description of the Related Art

A thin film transistor liquid crystal display (TFT LCD) mainly comprises a TFT array substrate, a color filter array substrate, and a liquid crystal layer. Wherein, the TFT array substrate is composed of a plurality of TFT arrays and pixel electrodes corresponding to each of the TFTs. A TFT serves as a switch of a pixel. In order to control the pixels, the scan lines and the data lines coupled to the TFTs are used to select a specific pixel. By applying a proper operational voltage, the data corresponding to the pixel can be displayed.

It is the trend that LCD panels are to be with high brightness, high contrast, large display size, and wide view angle. In order to improve the view angle of the LCD panel, several wide-view-angle techniques have been proposed. The popular LCDs with wide view angle include, for example, the multi-domain vertical alignment (MVA) LCD, the in-plane switching (IPS) LCD, and the fringe field switching (FFS) LCD. For an MVA LCD, plural slits are formed on the pixel electrode, for example. Plural protrusions are disposed on the color filter array substrate corresponding thereto. By matching the slits and the protrusions, liquid crystal molecules in the liquid crystal layer can tile in various directions and the wide-view-angle performance can be achieved.

Note that, in order to increase memory and maintenance functions of pixels for display data, portion of areas of pixel electrodes cover common lines to form metal-insulator-ITO (MII) storage capacitors Cst in the prior art technology. While forming data lines, sources and drains, a top electrode is disposed between each pixel electrode and a common line or scan line corresponding thereto. The pixel electrode and the top electrode are then electrically connected. The top electrode, the common line or scan line, and the dielectric layer between them constitute a metal-insulator-metal (MIM) storage capacitor.

FIG. 1A is a regional top view of a prior art TFT array substrate with an MIM storage capacitor. FIG. 1B is a cross-sectional view along the A-A' shown in FIG. 1A. Referring to FIGS. 1A and 1B, a portion of a pixel electrode 150 is disposed over a common line 110 corresponding thereto. A top electrode 130 is disposed between the pixel electrode 150 and the common line 110 corresponding thereto. In addition, a dielectric layer 120 is disposed between, and isolates the top electrode 130 and the common line 110 corresponding thereto. Another dielectric layer 140 is disposed between the top electrode 130 and the pixel electrode 150 corresponding thereto. Wherein, the dielectric layer 140 comprises a contact hole 142 which allows the top electrode 130, through the contact hole 142, electrically connecting with the pixel electrode 150. Accordingly, the common line 110, the dielectric layer 120, and the top electrode 130 constitute an MIM storage capacitor 102.

During forming the prior art TFT array, failures of storage capacitors may occur due to defects or other reasons. Such failures will result in defective pixels. Please refer to FIGS. 2A-4A and 2B-4B. Wherein, FIGS. 2A-4A are drawings showing top views of prior art defective pixels. FIGS. 2B-4B are cross-sectional views along A-A' shown in FIGS. 2A-4A.

Referring to FIGS. 2A and 2B, a defect 122 exits in the dielectric layer 120 between the common line 110 and the top electrode 130. The defect 122 can be, for example, a particle or a hole resulting from process contamination. The defect 122 results in charge leakage between the top electrode 130 and the common line 110. Referring to FIGS. 3A and 3B, while the data line 160 and the top electrode 130 are formed, a residue of a conductive material 170, such as aluminum, may be left between the data line 160 and the top electrode 130, so that the pixel electrode 150 is shorted to the data line 160 through the top electrode 130. Referring to FIGS. 4A and 4B, while the pixel electrode 150 is formed by the prior art technology, a residue of a conductive material 180, such as ITO, may be left between two neighboring pixel electrodes 150, and the neighboring pixel electrodes 150 are shorted. No matter what situation described above, the pixel cannot normally function, and the display quality of the LCD will be affected.

SUMMARY OF THE INVENTION

Accordingly, the present invention is directed to a TFT array substrate to prevent the abnormally displaying issue of the pixel resulting from process defects, and to enhance manufacturing yields.

The present invention is also directed to a repairing method of a TFT array substrate to repair the defective pixel of the TFT array substrate, and to enhance manufacturing yields of the TFT array substrate.

According to the objects described above and other objects, the present invention provides a TFT array substrate, which comprises a substrate; a plurality of scan lines, a plurality of data lines, a plurality of common lines, and a plurality of pixels disposed over the substrate. Wherein, the data lines and the scan lines define a plurality of pixel areas on the substrate. Each of the pixels is disposed in one of the pixel areas and driven by one of the scan lines and one of the data lines corresponding thereto. The common lines are disposed over the substrate, wherein a portion of each common line is arranged in one of the pixel areas. Each of the pixels comprises a TFT, a pixel electrode, a top electrode, and a conductive line. The TFT is coupled to a scan line and a data line corresponding thereto. The pixel electrode is disposed over a common line corresponding thereto, and coupled to the TFT. The top electrode is disposed between the pixel electrode and the common line corresponding thereto. A terminal of the conductive line is coupled to one side of the top electrode, and another terminal of the conductive line extends out of the common line and is coupled to the pixel electrode.

In a preferred embodiment of the present invention, the TFT array substrate further comprises a passivation layer which covers the TFTs and is disposed between the top electrodes and the pixel electrodes. In addition, each of the pixels further comprises a contact hole, for example. The contact hole is in the passivation layer and connects the conductive line and the pixel electrode corresponding thereto. Further, each conductive line comprises, for example, a bridge part and a contact part. Wherein, the contact part connects with the contact hole corresponding thereto, and the bridge part is coupled between the contact part and the top electrode corresponding thereto.

In a preferred embodiment of the present invention, each of the top electrodes comprises, for example, a first top sub-electrode, a second top sub-electrode, and a connection part. Wherein, a terminal of one of the conductive lines is coupled to one side of the first top sub-electrode. The connection part is coupled between the first top sub-electrode and the second top sub-electrode. In addition, the location of the pixel electrode corresponding to each first top sub-electrode and/or the second top sub-electrode comprises a first opening and/or a second opening. The location of the common line corresponding to each connection part comprises, for example, a third opening.

In a preferred embodiment of the present invention, the location of the pixel electrode corresponding to each conductive line comprises a fourth opening, for example.

The present invention also provides a repairing method of a TFT array substrate. The repairing method is adapted to repair the TFT array substrate. When a particle and/or a hole exists between one of the top electrodes and one of the common lines, a pixel corresponding thereto forms a defective pixel. The repairing method comprises: removing a portion of the conductive line of the defective pixel so that a top electrode and a pixel electrode of the defective pixel are electrically isolated.

In a preferred embodiment of the present invention, the repairing method of the TFT array substrate further comprises forming a fourth opening in the pixel electrode of the defective pixel corresponding to the conductive line before removing the portion of the conductive line of the defective pixel. The fourth opening avoids the short of the pixel electrode and the conductive line while removing the conductive line. In addition, the method of removing the portion of the conductive line of the defective pixel is, for example, a laser removing method.

In a preferred embodiment of the present invention, the repairing method of the TFT array substrate further comprises welding the top electrode of the defective pixel and the common line corresponding thereto. Before welding the top electrode of the defective pixel and the common line corresponding thereto, the repairing method further comprises forming a second opening in the pixel electrode of the defective pixel corresponding to the location of welding. The first opening or the second opening avoids the short of the top electrode, the common line, and the pixel electrode. In addition, the method of welding the top electrode of the defective pixel and the common line corresponding thereto is, for example, a laser welding method.

The present invention also provides another repairing method of a TFT array substrate. The repairing method is adapted to repair the TFT array substrate with a first top sub-electrode and a second top sub-electrode. When, a conductive residue exists between one of the first top sub-electrodes and one of the data lines so that a pixel corresponding thereto forms a defective pixel, the repairing method comprises: removing a portion of the connection part of the top electrode of the defective pixel so that the first top sub-electrode and the second top sub-electrode of the defective pixel are electrically isolated; removing a portion of the conductive line of the defective pixel so that the first top sub-electrode of the defective pixel and the pixel electrode are electrically isolated; and welding the second top sub-electrode of the defective pixel and the common line corresponding thereto. Accordingly, the second top sub-electrode and the pixel electrode corresponding thereto form an MII storage capacitor so that the defective pixel can normally function.

In a preferred embodiment of the present invention, before removing the portion of the connection part of the top electrode of the defective pixel, the repairing method further comprises forming a third opening in the common line of the defective pixel corresponding to the connection part, for example. The third opening avoids the short of the top electrode and the common line while removing the portion of the connection part. In addition, before removing the portion of the conductive line of the defective pixel, the repairing method further comprises forming a fourth opening in the pixel electrode of the defective pixel corresponding to the conductive line, for example. Further, before welding the second top sub-electrode of the defective pixel and the common line corresponding thereto, the repairing method further comprises forming a first or a second opening over the pixel electrode of the defective pixel corresponding to the location of welding, for example.

In a preferred embodiment of the present invention, the method of removing the portion of the conductive line or the portion of the connection part of the top electrode of the defective pixel is, for example, a laser removing method. The method of removing the portion of the second top sub-electrode and the common line corresponding thereto is, for example, a laser welding method.

The present invention further provides a repairing method of a TFT array substrate. The repairing method is adapted to repair the TFT array substrate with a first top sub-electrode and a second top sub-electrode. When a conductive residue exists between one of the second top sub-electrodes and one of the data lines so that a pixel corresponding thereto forms a defective pixel, the repairing method comprises removing a portion of the connection part of the top electrode of the defective pixel so that the second top sub-electrode and the first top sub-electrode are electrically isolated.

In a preferred embodiment of the present invention, before removing the portion of the connection part of the top electrode of the defective pixel, the repairing method further comprises forming an opening in the common line of the defective pixel corresponding to the connection part. The method of removing a portion of the connection part of the top electrode of the defective pixel is, for example, a laser removing method.

In a preferred embodiment of the present invention, the repairing method is adapted to repair the TFT array substrate described above. When a conductive residue exists between two neighboring pixel electrodes or a particle and/or a hole exists between one of the pixel electrodes and the common line corresponding thereto so that a pixel corresponding thereto forms a defective pixel, the repairing comprises removing a portion of the pixel electrode of the defective pixel so that the conductive residue and the rest portion of the pixel electrode are electrically isolated.

In the repairing method of the TFT array substrate described above, each pixel electrode comprises, for example, at least one slit. Each slit crosses over the top electrode corresponding thereto, and the conductive residue and the conductive line are electrically isolated by the step of removing the portion of the pixel electrode of the defective pixel and the slit corresponding thereto. In addition, the method of removing the portion of the pixel electrode of the defective pixel is, for example, a laser removing method.

After the repairing method described above has been processed, the storage capacitor of the defective pixel may be changed that its feed-through voltage differs from that of other normal pixel, and thus the display quality is affected. In the TFT array substrate of the present invention, each TFT comprises: a gate, a channel layer, a source/drain and an extension electrode. The gate is coupled to the scan line corresponding thereto. The channel layer is disposed over the gate. The source/drain is disposed over the channel layer above the gate, and coupled to the data line and the pixel electrode corresponding thereto. The extension electrode is coupled to one side of the source/drain. The extension electrode extends over the scan line corresponding thereto to cooperate with the scan line to form a parasitic capacitor. The repairing method further comprises removing at least a portion of the extension electrode of the defective pixel to change the parasitic capacitor so as to compensate the variation of the storage capacitor.

Accordingly, the TFT array substrate and the repairing method thereof repair different types of defective pixels by the design of the conductive line and the connection part of the top electrode. As a result, the defective pixels can normally function. The TFT array substrate and the repairing method thereof effectively eliminate the abnormally displaying issue of the pixel resulting from process defects and improve the manufacturing yields.

The above and other features of the present invention will be better understood from the following detailed description of the preferred embodiments of the invention that is provided in communication with the accompanying drawings.

BRIEF DESCRIPTION OF THE DRAWINGS

FIGS. 2A-4A are drawings showing top views of various prior art defective MIM storage capacitor.

FIGS. 2B-4B are cross-sectional views along A-A' shown in FIGS. 2A-4A.

DESCRIPTION OF SOME EMBODIMENTS

Figure 1A:
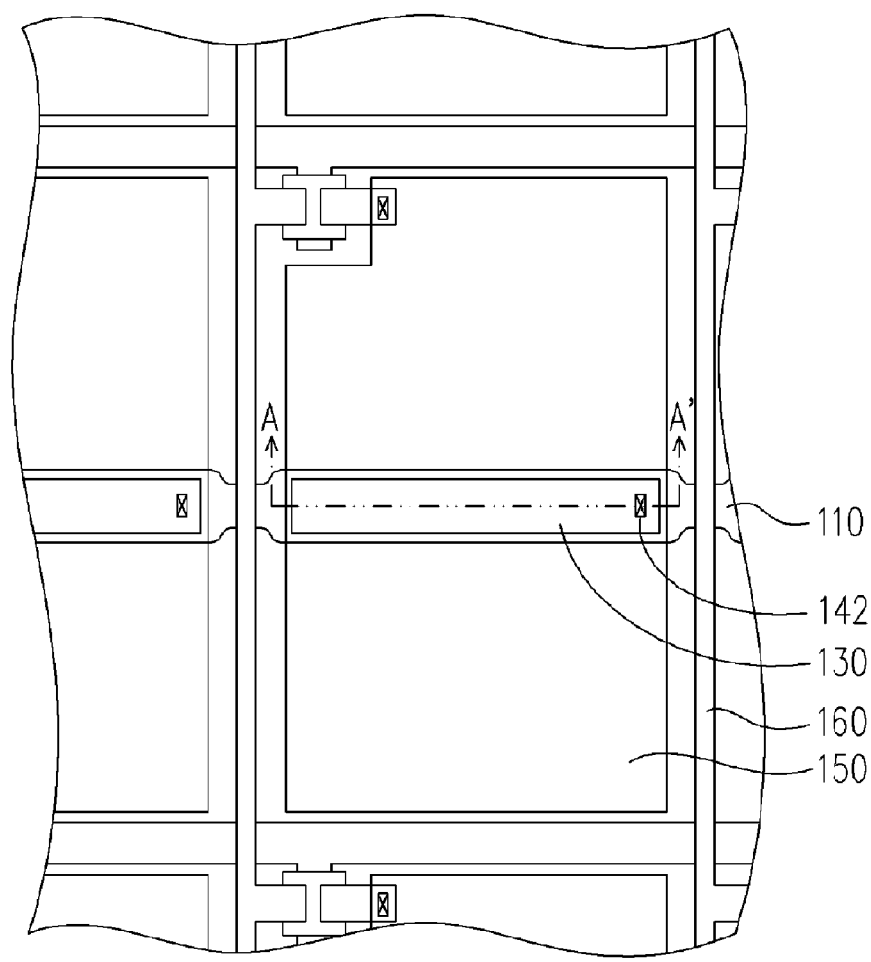
FIG. 1A is a regional top view of a prior art TFT array substrate with an MIM storage capacitor.
Figure 1B:
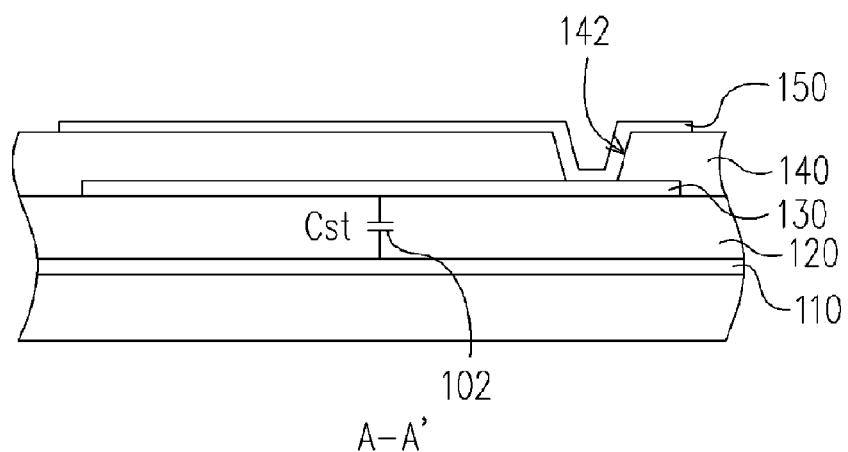
FIG. 1B is a cross-sectional view along the A-A' shown in FIG. 1A.
Figure 2A:
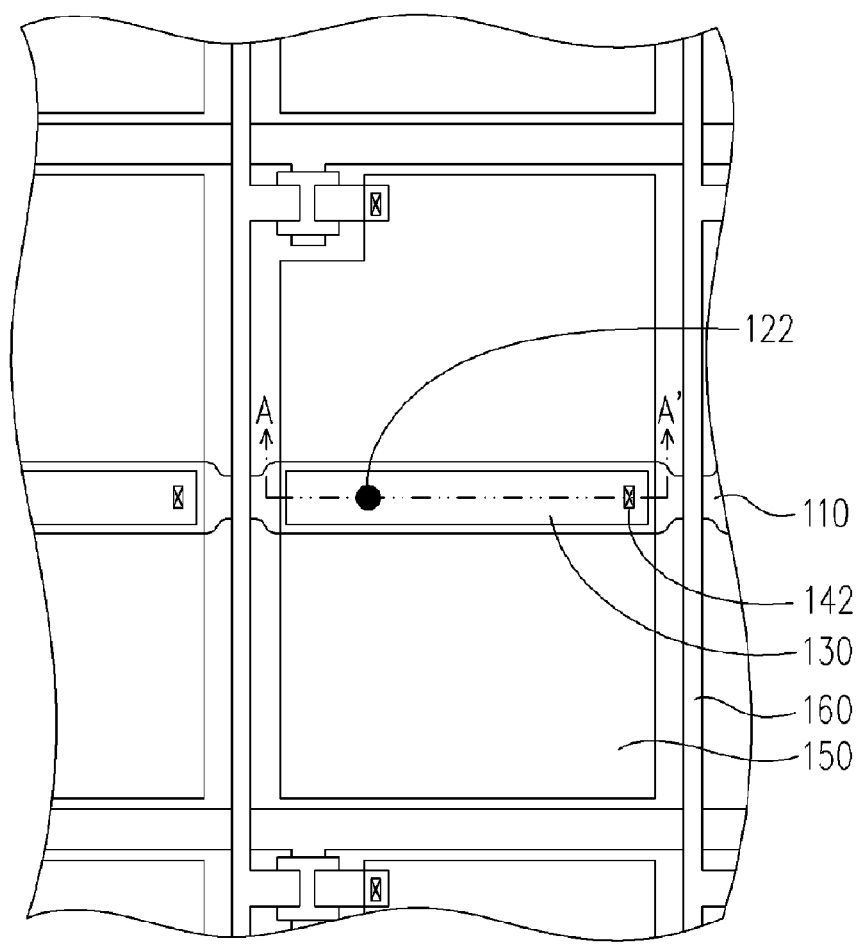
Figure 2B:
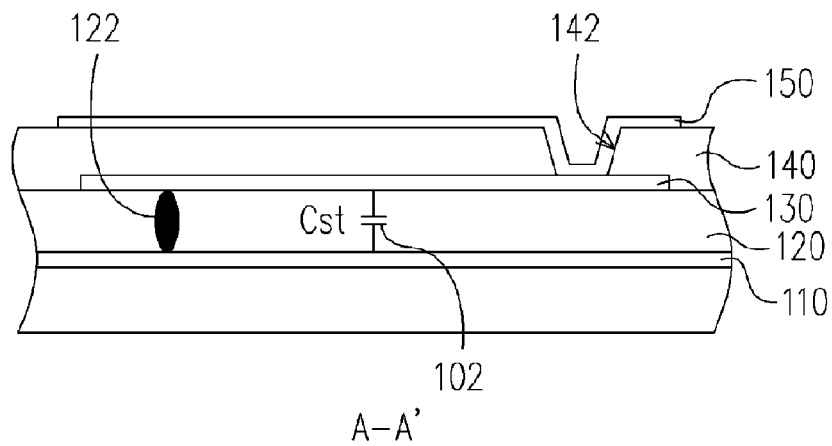
Figure 3A:
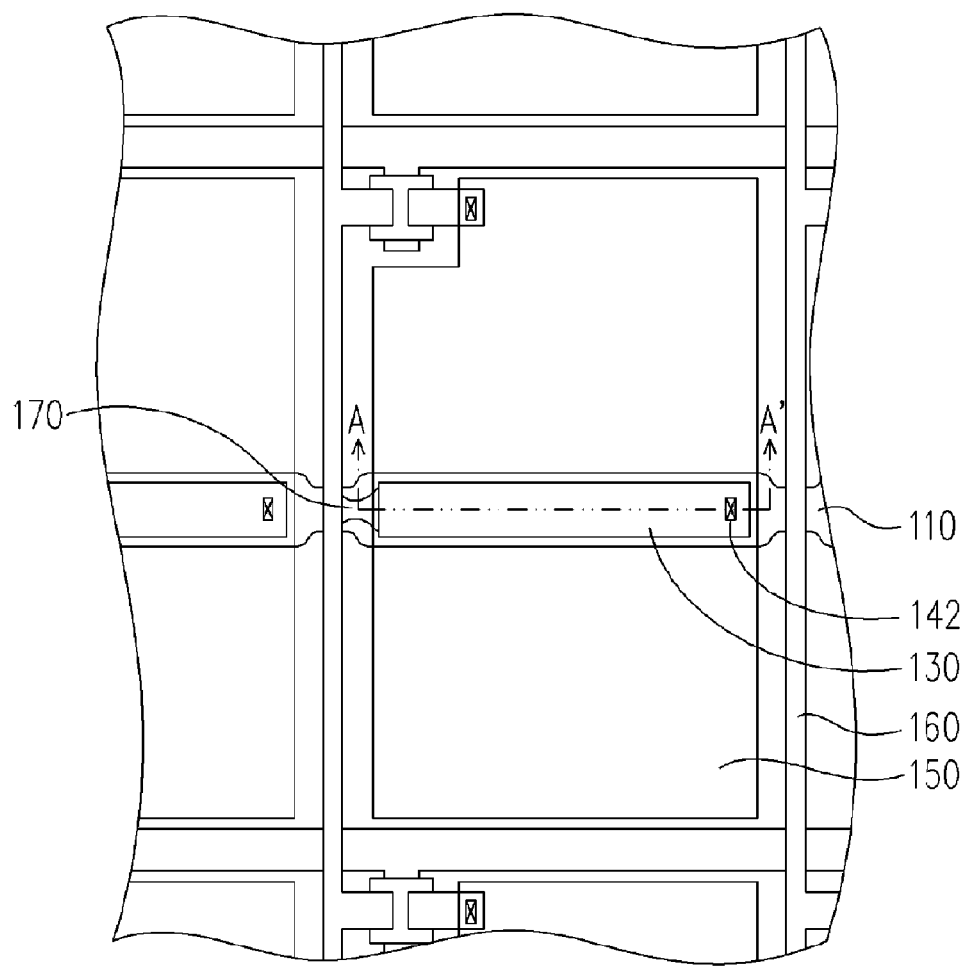
Figure 3B:
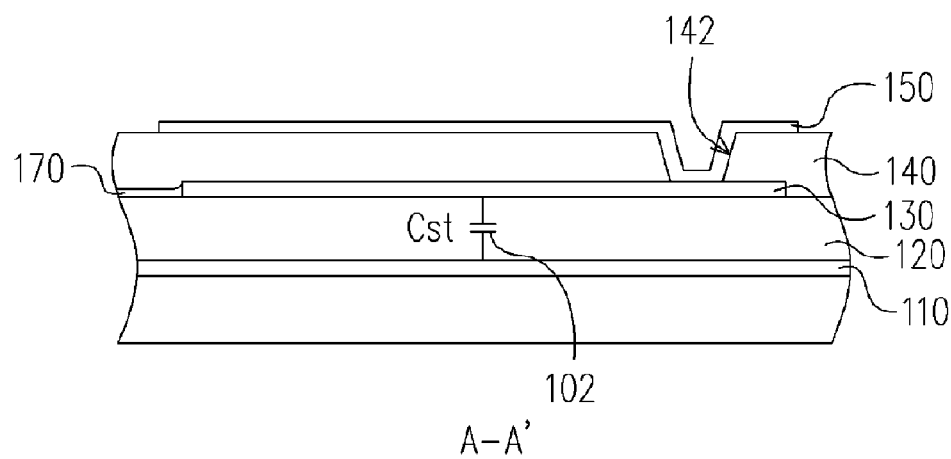
Figure 4A:
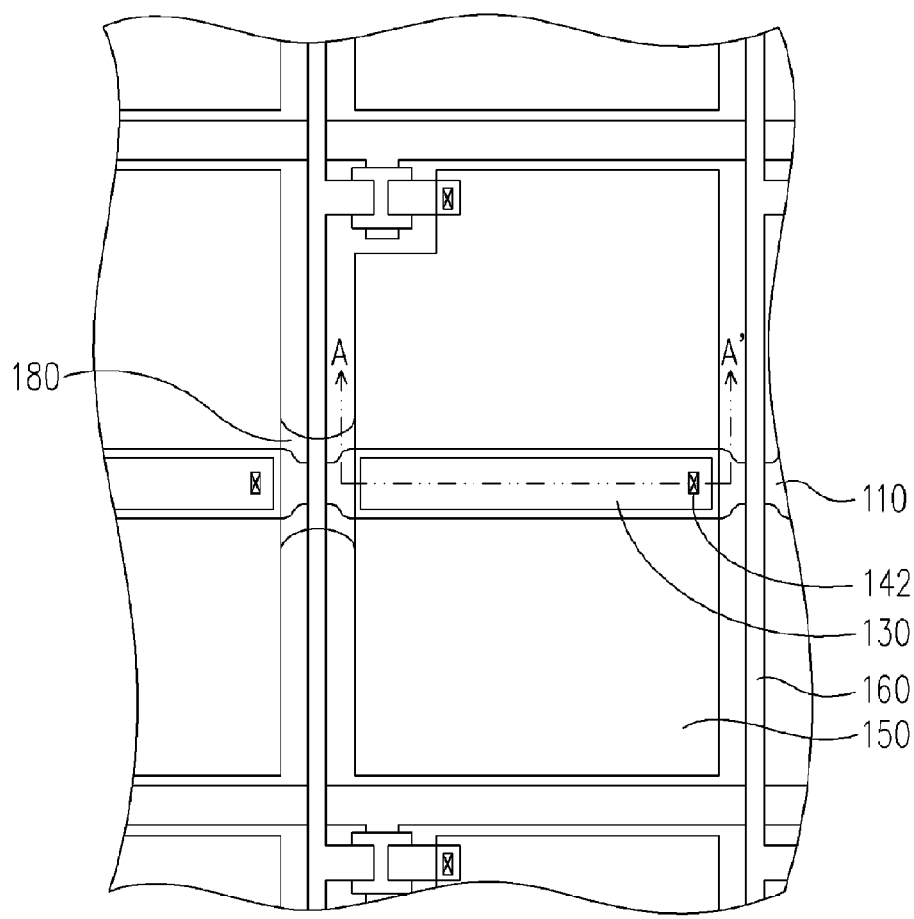
Figure 4B:
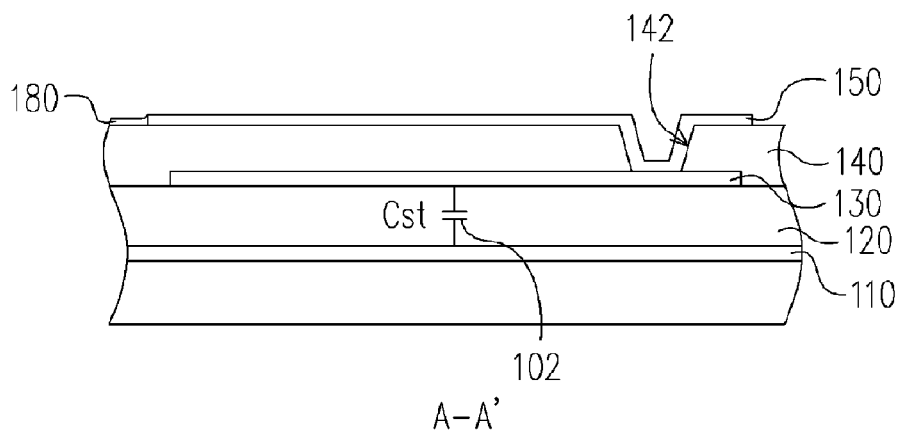
Figure 5A:
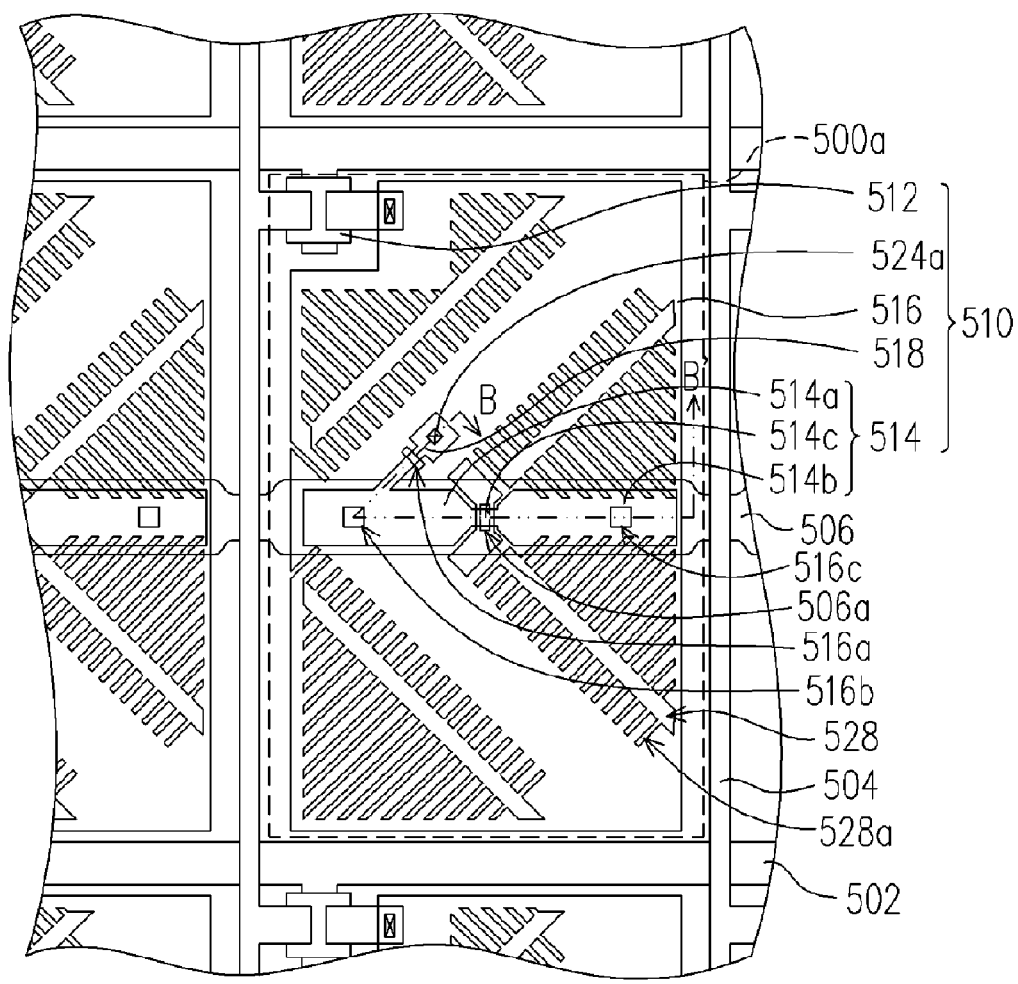
FIG. 5A is a regional top view of an MVA LCD TFT array substrate according to an embodiment of the present invention.
Figure 5B:
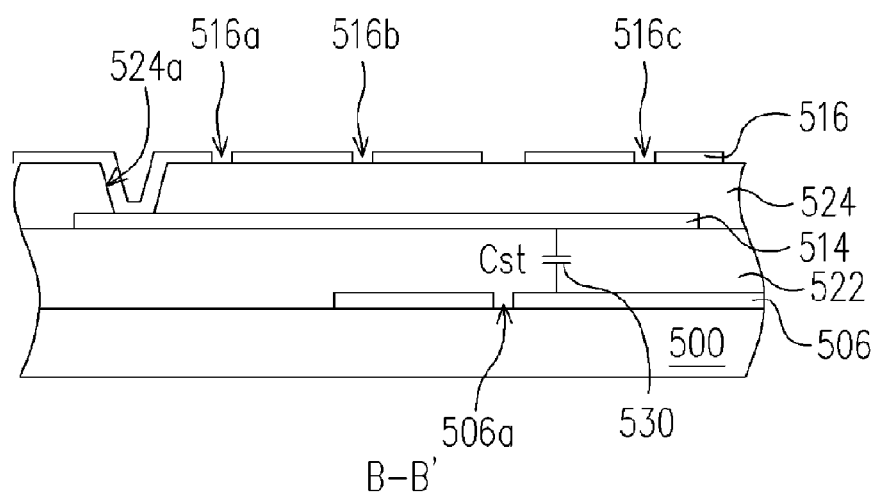
FIG. 5B is a cross-sectional view along B-B' shown in FIG. 5A.

FIG. 5A is a regional top view of a TFT array substrate according to an embodiment of the present invention. FIG. 5B is a cross-sectional view along B-B' shown in FIG. 5A. The TFT array substrate is adapted for a Multi-Domain Vertical Alignment (MVA) LCD panel, for example. Referring to FIGS. 5A and 5B, the substrate 500 can be, for example, a glass substrate. A plurality of scan lines 502 and a plurality of data lines 504 are disposed over the substrate 500, for example, and define a plurality of pixel areas 500a on the substrate 500. In addition, a plurality of common lines 506 is disposed over the substrate 500. The common lines 506 and the scan lines 502 can be formed in a same process, and the material is for example Cr, Al, or other metals with good conductivity. Each of the common lines 506 is disposed in the pixel area 500a corresponding thereto.

Referring to FIGS. 5A and 5B, each pixel area 500a comprises a pixel 510, for example. The pixel 510 comprises a TFT 512, a top electrode 514, a pixel electrode 516, and a conductive line 518. Wherein, the TFT 512 is coupled to, and driven by the scan line 502 and the data line 504 corresponding thereto. In addition, the top electrode 514 is disposed over the common line 506. The top electrode 514 and the data line 504 can be formed in the same process, for example. The top electrode 514 comprises a material, such as Cr, Al, or other metals with good conductivity. In an embodiment, each top electrode 514 comprises, for example, a first top sub-electrode 514a and a second top sub-electrode 514b. A connection part 514c connects the first top sub-electrode 514a and the second top sub-electrode 514b. In addition, a dielectric layer 522 is disposed between the top electrode 514 and the common line 506, for example. The material of the dielectric layer can be, for example, SiNx.

Referring to FIGS. 5A and 5B, the conductive line 518 is coupled to one side of the top electrode 514 and can be formed with the data line 504 in a same process, for example. The connection part of the conductive line 518 connects with one side of the first top sub-electrode 514a and extends out of the common line 506. In addition, the pixel electrode 516 is disposed over the top electrode 514 and a dielectric layer 524, such as a passivation layer, is disposed between them. The pixel electrode 516 is coupled to a contact part of the conductive line 518 through a contact hole 524a in the dielectric layer 524 so that the top electrode 514 and the common line 506 corresponding thereto form an MIM storage capacitor 530. In addition, the pixel electrode 516 comprises, for example, a plurality of slits 528, which have a zigzag profile. Two sides of each slit 528 comprise, example, outward-extending sub-slits 528a. An edge of each sub-slit 528 has a jag profile. Wherein, the material of the pixel electrode 516 can be, for example, Indium-Tin-Oxide (ITO) or other transparent conductive materials. With the slits 528, the electrical field affecting liquid crystal molecules (not shown) over the pixel electrode 516 can be changed to provide the multi-domain vertical alignment and to achieve the wide-view-angle display effect.

In an embodiment of the present invention, the conductive line 518 can be disposed between two neighboring slits 528, for example. The conductive line 518 can be parallel to the slits 528. Accordingly, after the assembly of the TFT array substrate and the color filter substrate (not shown), the conductive line 518 corresponds under a MVA protrusion (not shown) on the color filter substrate (not shown), and does not cause impact to the aperture ratio of the LCD panel (not shown). In addition, in the TFT array substrate of the present invention, a plurality of openings can be formed over the pixel electrode 516 to facilitate the subsequent repairing step. For example, an opening 516a can be formed over the pixel electrode 516 corresponding to the conductive line 518, for example. Openings 516b and 516c can be formed over the pixel electrode 516 corresponding to the first top sub-electrode 514a and the second top sub-electrode 514b, for example. An opening 506a can be formed over the common line 506 corresponding to the connection part 514c, for example. The functions of the openings 516a-516c and 506a are described in detail below.

Besides, the number of conductive line 518 may be more than one line in another embodiment (not shown).

Following are descriptions of the repairing method to repair the defective pixel of the TFT array substrate described above.

Figure 6A:
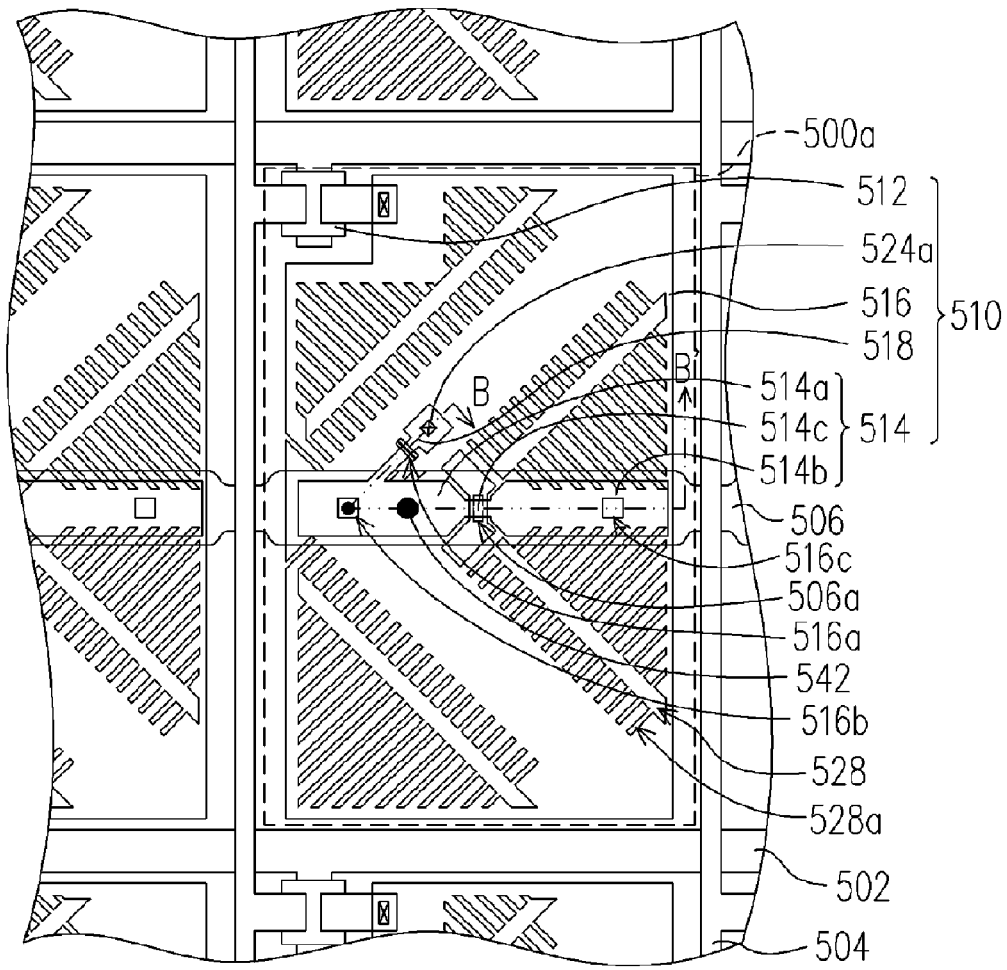
FIG. 6A is a regional top view of a TFT array substrate with a defective pixel according to an embodiment of the present invention.
Figure 6B:
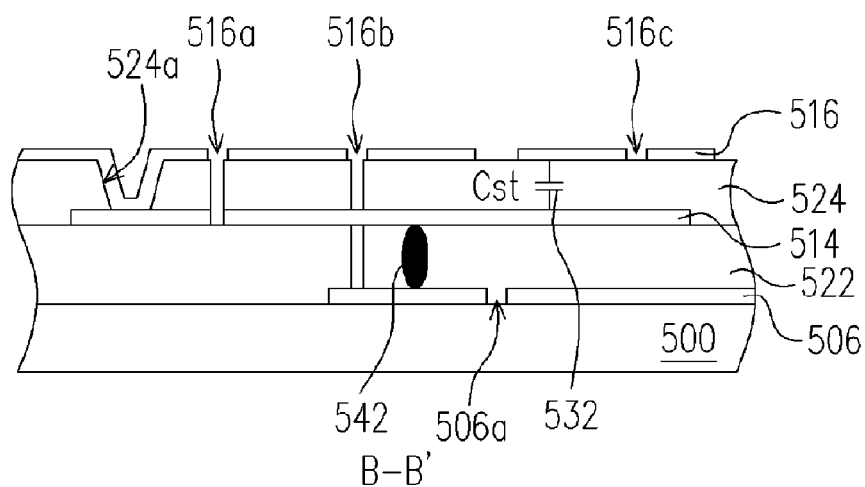
FIG. 6B is a cross-sectional view along B-B' shown in FIG. 6A.

Referring to FIGS. 6A and 6B, FIG. 6A is a regional top view of a TFT array substrate with a defective pixel according to an embodiment of the present invention. FIG. 6B is a cross-sectional view along B-B' shown in FIG. 6A. Referring to FIGS. 6A and 6B, a defect 542 is located in the dielectric layer 522 between the top electrode 514 and the common line 506. The defect 542 can be, for example, a particle or a hole caused by process contamination. The defect 542 results in charge leakage between the first top sub-electrode 514a and the common line 506. As a result, the pixel 510 fails and becomes a defective pixel.

Referring to FIGS. 6A and 6B, in the repairing method of the present invention, laser is used to remove a portion of the conductive line 518, for example, so that the pixel electrode 516 and the top electrode 514 are electrically isolated. Wherein, the removed conductive line 518 corresponds to the opening 516a of the pixel electrode 516, for example, so that the short between the pixel electrode 516 and the conductive line 518 can be avoided while the laser melts the pixel electrode 516. In addition, the present invention further comprises welding the top electrode 514 and the common line 506 corresponding thereto, for example, so that the top electrode 514 and the pixel electrode 516 form an MII storage capacitor 532. Accordingly, the pixel 510 can normally function. Wherein, the method of welding the top electrode 514 and the common line 506 is, for example, a laser welding method. The location of welding can be in the opening 516b or 516c of the pixel electrode 516 to avoid the short of the pixel electrode 516 and the top electrode 514 while the laser melts the pixel electrode 516. Note that the sequence of removing the portion of the conductive line 518, and welding the top electrode 514 and the common line 506 are not particularly fixed. In other words, in the repairing method of the present invention, the step of welding the top electrode 514 and the common line 506 can be performed before the step of removing the portion of the conductive line 518.

Figure 7A:
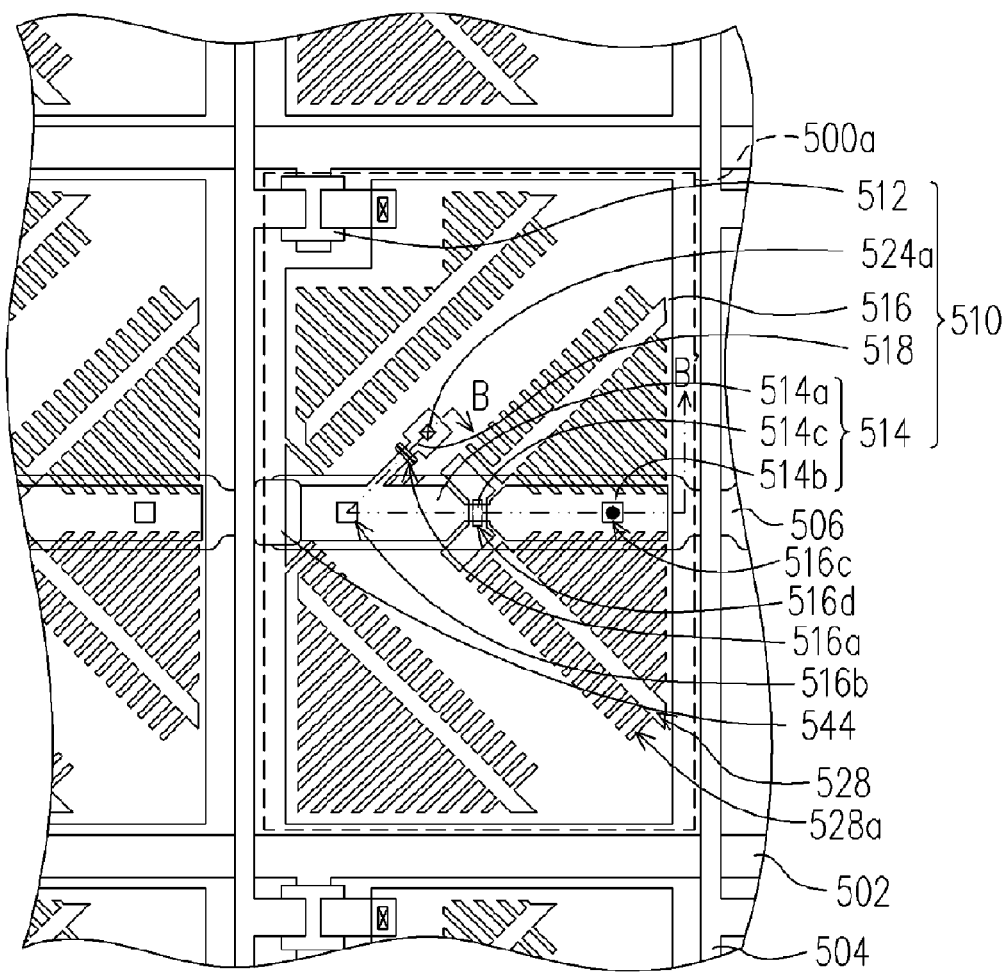
FIG. 7A is a regional top view of a TFT array substrate with another defective pixel according to an embodiment of the present invention.
Figure 7B:
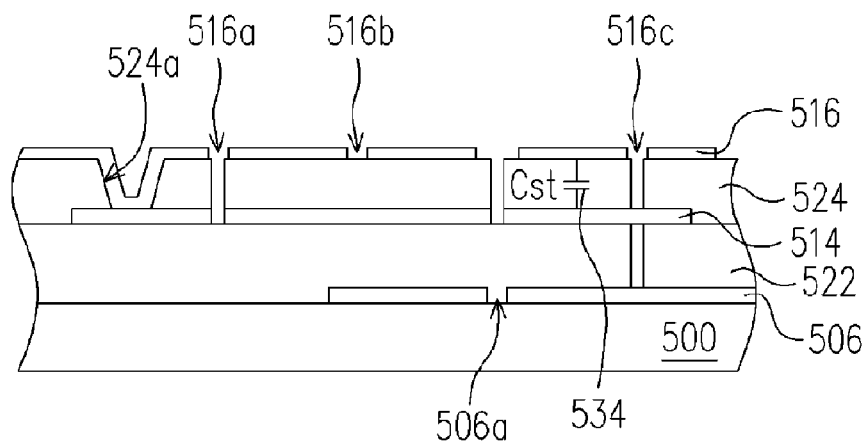
FIG. 7B is a cross-sectional view along B-B' shown in FIG. 7A.

Please refer to FIGS. 7A and 7B. FIG. 7A is a regional top view of a TFT array substrate with another defective pixel according to an embodiment of the present invention. FIG. 7B is a cross-sectional view along B-B' shown in FIG. 7A. Referring to FIGS. 7A and 7B, a conductive residue 544 exists between the first top sub-electrode 514a and the data line 504, for example. Wherein, the first top sub-electrode 514a is shorted to the data line 504 through the conductive residue 544 so that the pixel 510 is affected by the display signal of the data line 504 and cannot normally function. Generally, the conductive residue 544 can be aluminum or other conductive material caused by an incomplete etching process or other mis-operational process while the top electrode 514 and the data line 504 are formed.

Referring to FIGS. 7A and 7B, the repairing method of the present invention comprises removing a portion of the conductive line 518 by laser so that the pixel electrode 516 and the first top sub-electrode 514a are electrically isolated. Wherein, the removed conductive line 518 may also correspond to the opening 516a of the pixel electrode 516 to avoid the short of the pixel electrode 516 and the conductive line 518 while welding. In addition, the repairing method of the present invention comprises removing a portion of the connection part 514c of the top electrode 514 by laser, so that the first top sub-electrode 514a and the second top sub-electrode 514b are electrically isolated. Wherein, the opening 506a can be formed in the common line 506 to avoid the short of the common line 506 and the top electrode 514 while the portion of the connection part 514c is removed. In addition, the repairing method of the present invention also comprises welding the second top sub-electrode 514b and the common line 506 corresponding thereto. The second top sub-electrode 514b and the pixel electrode 516 constitute an MII storage capacitor 534, and the pixel 510 can normally function. Wherein, the method of welding the second top sub-electrode 514b and the common line 506 is, for example, a laser welding method. The location of the welding can be, for example, in the opening 516c of the pixel electrode 516 to avoid the short the pixel electrode 516 and the second top sub-electrode 514b, while the laser melts the pixel electrode 516. Note that the sequence of removing the portion of the conductive line 518, removing the portion of the connection part 514c of the top electrode 514, and welding the top electrode 514 and the common line 506 are not fixed. In other embodiments, the sequence of performing these steps can be modified based on different requirements.

Figure 8A:
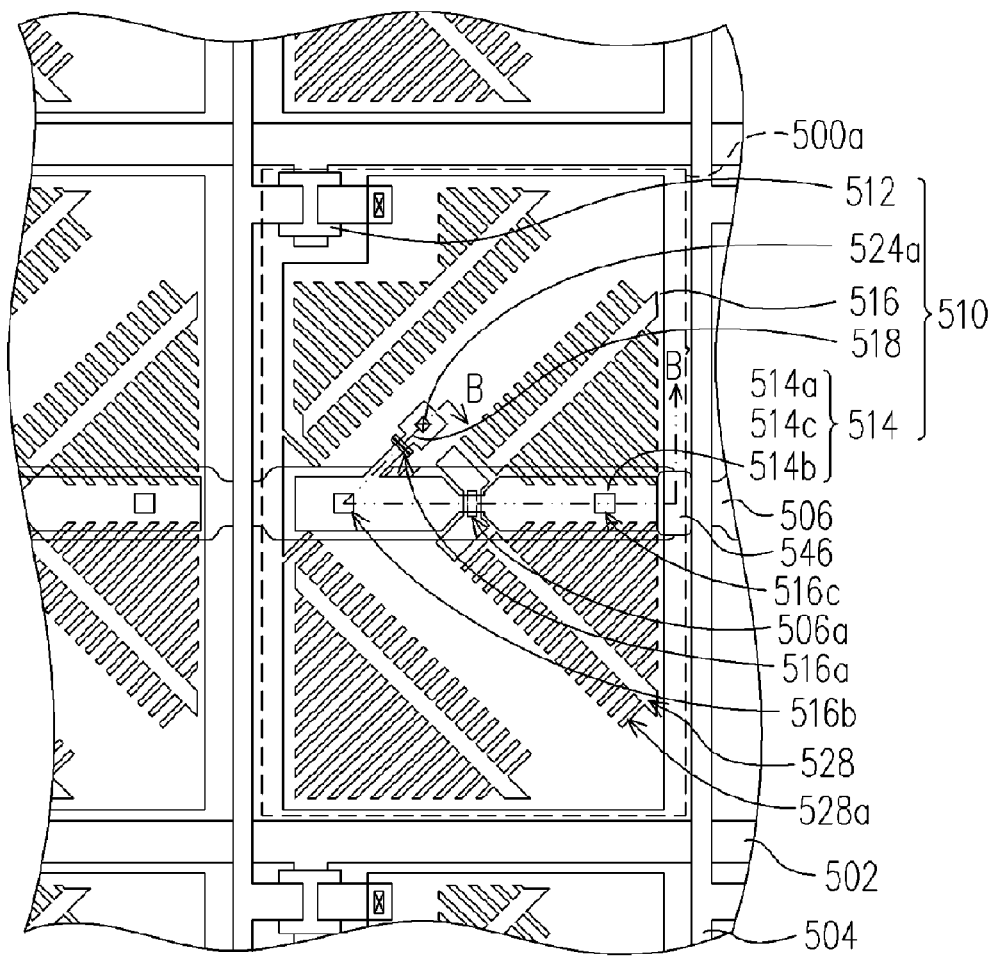
FIG. 8A is a regional top view of a TFT array substrate with a defective pixel according to an embodiment of the present invention.
Figure 8B:
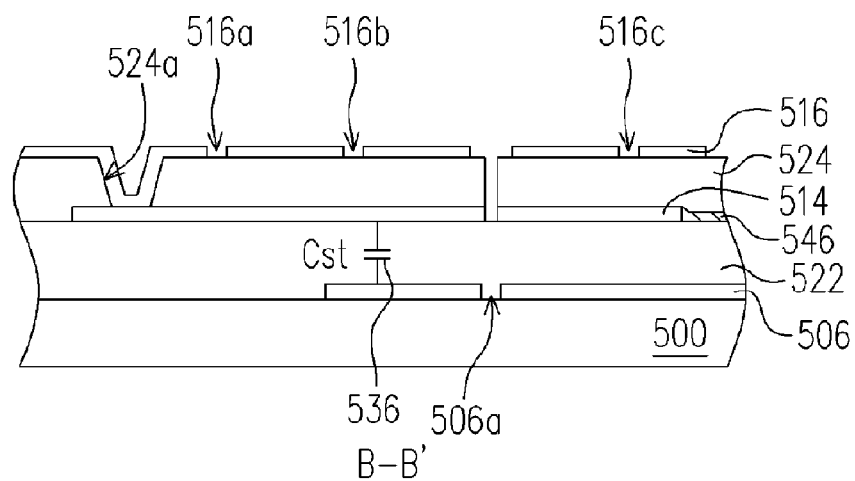
FIG. 8B is a cross-sectional view along B-B' shown in FIG. 8A.

Referring to FIGS. 8A and 8B, FIG. 8A is a regional top view of a TFT array substrate with a defective pixel according to an embodiment of the present invention. FIG. 8B is a cross-sectional view along B-B' shown in FIG. 8A. Referring to FIGS. 8A and 8B, a conductive residue 546 exists between the second top sub-electrode 514b and the data line 504, for example. Wherein, the second top sub-electrode 514b is shorted to the data line 504 through the conductive residue 546 so that the pixel 510 is affected by the display signal of the data line 504 and cannot normally function. The conductive residue 546 can be aluminum or other conductive material caused by an incomplete etching process or other mis-operational process while the top electrode 514 and the data line 504 are formed.

Referring to FIGS. 8A and 8B, the repairing method of the present invention comprises removing a portion of the connection part 514c of the top electrode 514 by laser so that the first top sub-electrode 514a and the second top sub-electrode 514b are electrically isolated. Wherein, the opening 506a formed in the common line 506 can avoid the short of the common line 506 and the top electrode 514 while the portion of the connection part 514c is removed. Accordingly, the first top sub-electrode 514a, the dielectric layer 522, and the common line 506 constitute an MIM storage capacitor 536, and the pixel 510 can normally function.

Figure 9A:
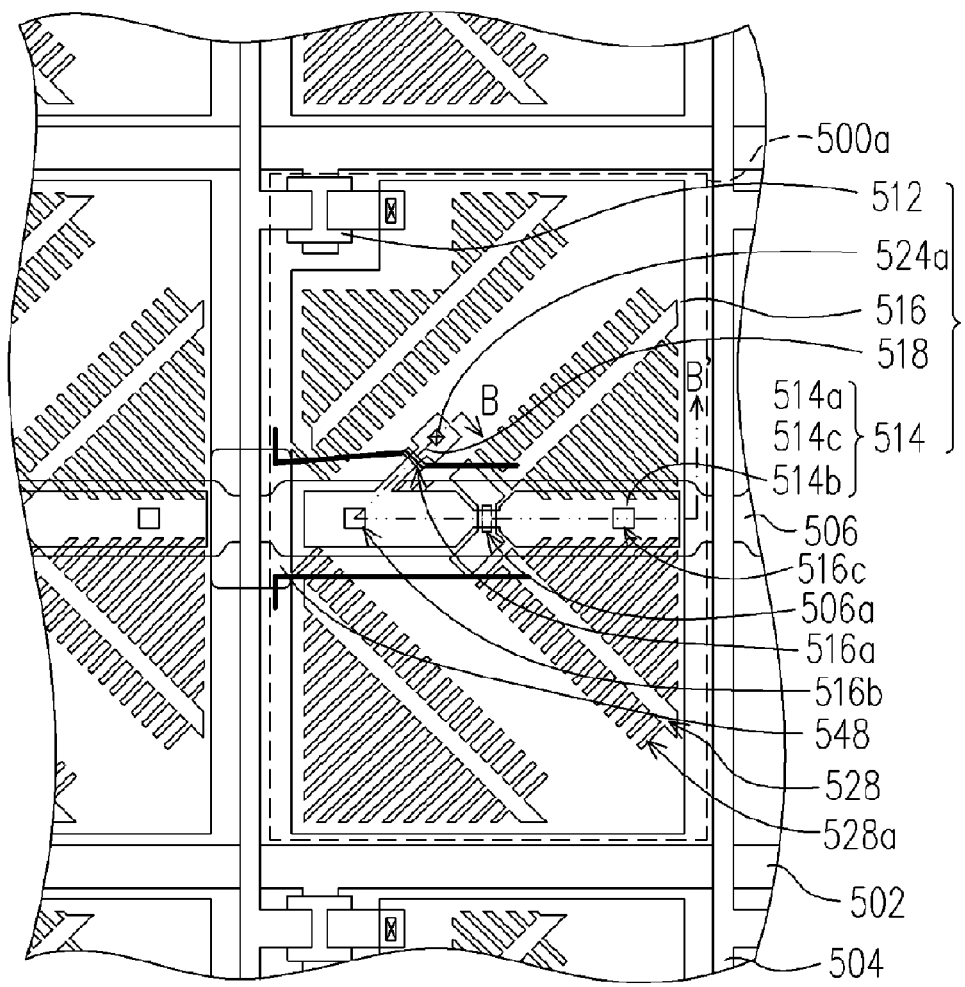
FIG. 9A is a regional top view of a TFT array substrate with a defective pixel according to an embodiment of the present invention.
Figure 9B:
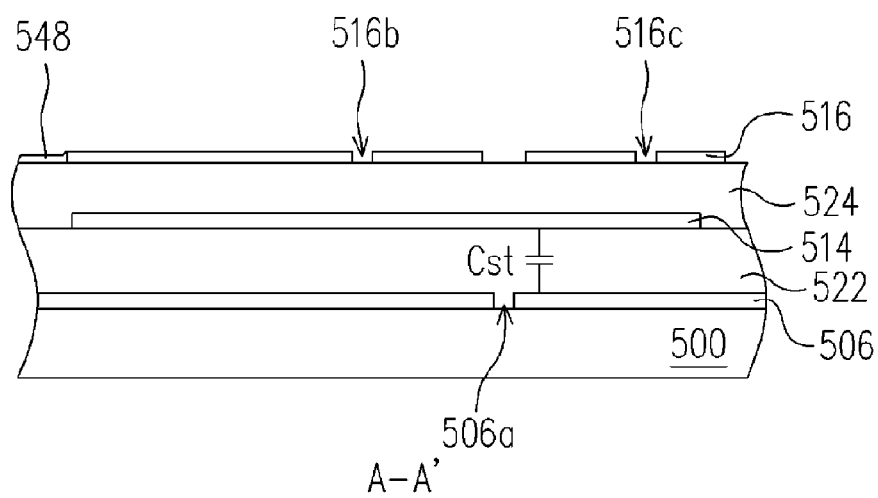
FIG. 9B is a cross-sectional view along B-B' shown in FIG. 9A.

Referring to FIGS. 9A and 9B, wherein FIG. 9A is a regional top view of a TFT array substrate with a defective pixel according to an embodiment of the present invention. FIG. 9B is a cross-sectional view along B-B' shown in FIG. 9A. Referring to FIGS. 9A and 9B, a conductive residue 548 exists between pixel electrodes 516 of two neighboring pixels 510, for example, so that the two pixel electrodes 516 are shorted through the conductive residue 548. Generally, the method of forming the pixel electrodes 516 comprises, for example, forming a transparent conductive film (not shown) over the substrate 500 by a sputtering method or a co-evaporation method, and patterning the transparent conductive film (not shown) by a photolithographic method and an etching process. Accordingly, the patterned pixel electrodes 516 are formed. If the etching process for the transparent conductive film (not shown) is incomplete, the conductive residue 548 described above is thus formed.

Further referring to FIGS. 9A and 9B, the repairing method of the present invention comprises removing a portion of the pixel electrode 516 by laser so that the conductive residue 548 is separated from the conductive line 518, and the connected neighboring pixels 510 can be electrically isolated. Wherein, the removed area can be extended to the conductive residue 548 between the data line 504 and the pixel electrode 516 to make sure that the conductive residue 548 is completely separated from the remaining pixel electrode 516. Note that the pixel electrode 516 of the present invention comprises the slit 528, and the slit 528 crosses over the top electrode 514 corresponding thereto. By only removing portions of the pixel electrode 516 over at both sides of the top electrode 514 and extending the removed area to the slit 528, the conductive line 518 can be effectively separated from the conductive residue 548.

Figure 10A:
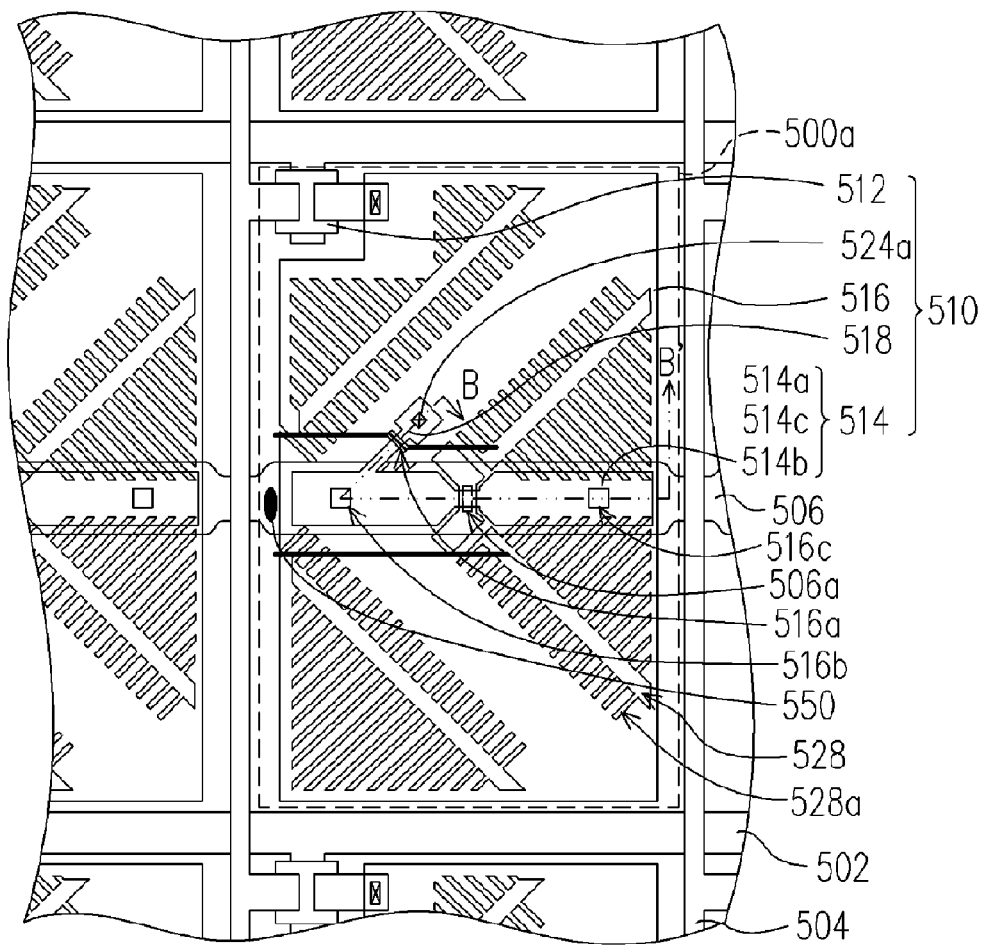
FIG. 10A is a regional top view of a TFT array substrate with a defective capacitor according to an embodiment of the present invention.
Figure 10B:
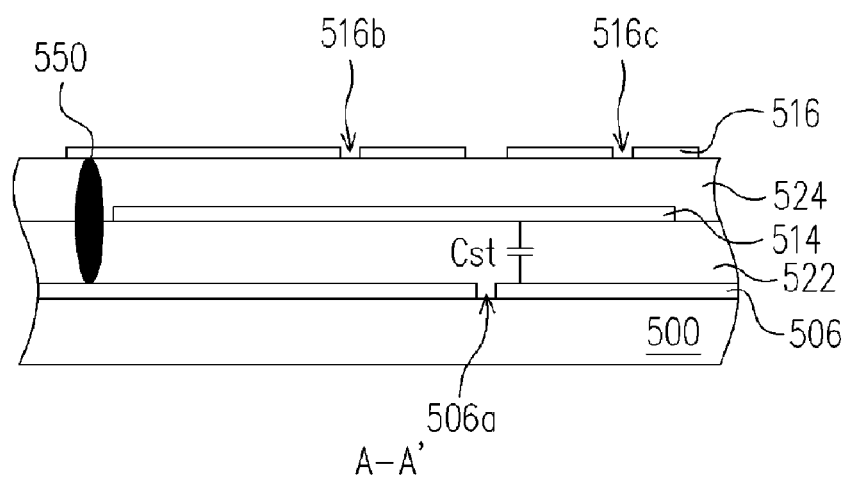
FIG. 10B is a cross-sectional view along B-B' shown in FIG. 10A.

Refer to FIGS. 10A and 10B. FIG. 10A is a regional top view of a TFT array substrate with a defective capacitor according to an embodiment of the present invention. FIG. 10B is a cross-sectional view along B-B' shown in FIG. 10A. Referring to FIGS. 10A and 10B, a defect 550 exists between the pixel electrode 516 and the common line 506, or in the dielectric layer 522 or/and the dielectric layer 524. Wherein, the defect 550 can be, for example, a particle or a hole caused by process contamination. The defect 550 results in charge leakage between the pixel electrode 516 and the common line 506. As a result, the pixel 510 can not normally display.

Further referring to FIGS. 10A and 10B, the repairing method of the present invention comprises removing a portion of the pixel electrode 516 by laser so that the conductive residue 550 is separated from the conductive line 518. Accordingly, the charge leakage between the pixel electrode 516 and the common line 506 can be avoided. With the slit 528 of the pixel electrode 516, when the portion of the pixel electrode 516 is removed, the conductive line 518 can be effectively separated from the conductive residue 550 by only removing portions of the pixel electrode 516 at both sides of the top electrode 514 and extending the removed area to the slit 528.

Figure 11:
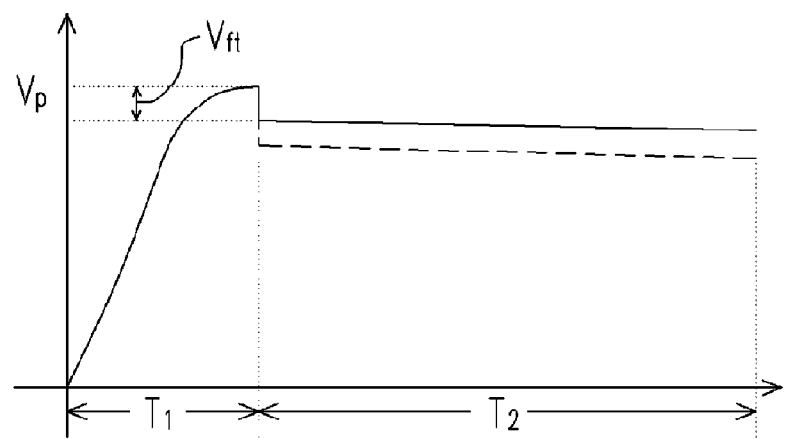
FIG. 11 is a configuration showing a charging waveform of a TFT LCD according to an embodiment of the present invention.

In more detail, please refer to FIG. 11. FIG. 11 is a configuration showing a charging waveform of a TFT LCD according to an embodiment of the present invention. During the write period TI, the TFT is turned on, and the liquid crystal capacitor CLC and the storage capacitor Cst of the pixel are charged to a voltage Vp. During the maintenance period T2, the TFT is turned off, and a voltage drop of a feed-through voltage Vft is generated. Generally, the feed-through voltage Vft=(Vgh−Vgl)Cgd/(CLC+Cst), wherein Vgh represents the gate voltage while the TFT is turned on, and the Vgl represents the gate voltage while the TFT is turned off.

Basically, the repairing method of the present invention may cause the variation of total capacitance in one pixel. According to the formula described above, the feed-through voltage Vft increases as shown the dot line in FIG. 11. Under this circumstance, the defective pixel and the other normal pixels have different final voltage. It is easy to find out the bright pixel in dark image.

Figure 12:
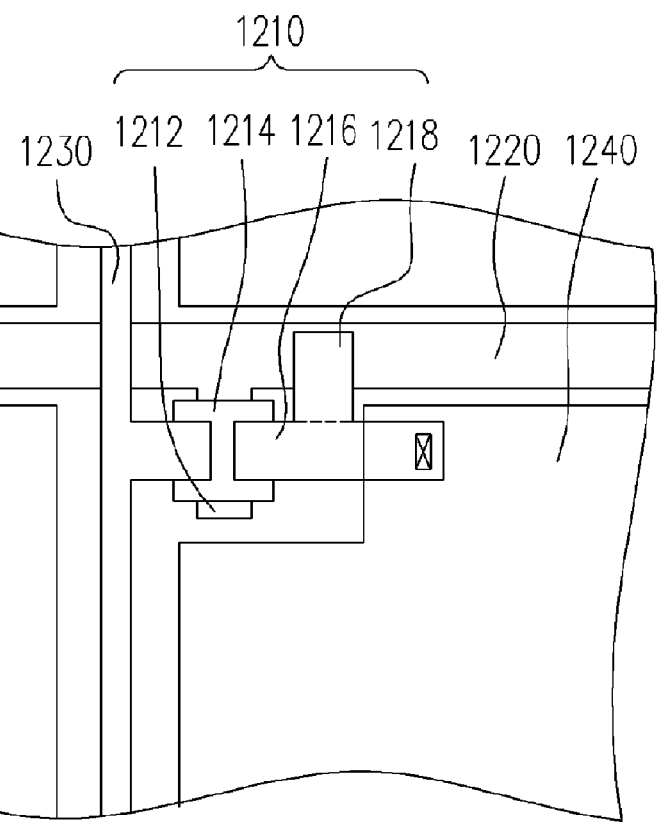
FIG. 12 is a schematic drawing showing a TFT array substrate according to an embodiment of the present invention.

Accordingly, the present invention further provides another design of the TFT array substrate. FIG. 12 is a schematic drawing showing a TFT array substrate according to an embodiment of the present invention. Only partial devices are described in FIG. 12. Other detailed descriptions of the structures and modifications refer to the embodiments described above. Referring to FIG. 12, the TFT 1210 comprises, for example, a gate 1212, a channel layer 1214, a source/drain 1216 and an extension electrode 1218. Wherein, the gate 1212 is coupled to the scan line 1220, and the channel layer 1214 is disposed over the gate 1212. In addition, the source/drain 1216 is disposed over the channel layer 1214 above the gate 1212, and coupled to the data line 1230 and the pixel electrode 1240 corresponding thereto. The extension electrode 1218 and the source/drain 1216 can be the same layer structure, for example, and formed in a same process. The extension electrode 1218 is coupled to one side of the source/drain 1216 and extends over the scan line 1220 corresponding thereto. The extension electrode 1218 and the scan line 1220 then constitute a parasitic capacitor.

Accordingly, while the defective pixel is repaired and the storage capacitance variation happens, at least a portion of the extension electrode 1218 of the defective pixel can be removed. For example, the connection part of the extension electrode 1218 and the source/drain 1216, or partial or whole the extension electrode 1218 above the scan line 1220 can be removed to modify the parasitic capacitance between the scan line 1220 and the extension electrode 1218 so to compensate the storage capacitance variation caused by the repairing process.

The TFT array substrate and the repairing method thereof can be used in an MVA LCD panel. By cutting the pixel electrodes along the slits on the pixel electrodes, the portion of the pixel electrode corresponding to the defective pixel capacitor can be completely separated from the conductive line, and the pixel can normally function. The TFT array substrate and the repairing method thereof according to the present invention, of course, are not limited to the application in the MVA LCD panel. In other embodiments of the present invention, the TFT array substrate and the repairing method thereof can be used in Twisted Nematic (TN), Super Twisted Nematic (STN), or other LCD panels. Even if the pixel electrode of the TFT array substrate does not comprise the slit, the repairing method of the present invention can achieve the purpose of isolating the defective capacitor by changing the cutting route.

The embodiments and figures described above are only illustrious examples. Locations and amount of the defects and conductive residues may vary with the different manufacturing processes. The reason of causing the defective capacitor is also not limited to the existence of the defects and the conductive residues mentioned above. In addition, though the top electrode only comprises a first top sub-electrode and a second top sub-electrode in the embodiments described above, one of ordinary skill in the art may modify such structure within the scope of the present invention. The modification can include changes of amounts, shapes, or locations of the top electrode based on different requirements and design. The connection part is also optional. Its function is to reduce the process time and costs of the laser removing step.

Accordingly, the TFT array substrate and the repairing method thereof according to the present invention comprise at least following features and advantages.

The connection part, i.e., the contact hole, between the top electrode and the pixel electrode can be moved out of the top electrode by a conductive line. Wherein, the top electrode and the pixel electrode can be electrically isolated by removing a portion of the conductive line. Accordingly, the repairing process is simplified and the repairing yield is also enhanced.

When the present invention is applied to the MVA LCD panel, the conductive line corresponds under the strip protrusion of the color filter substrate. The conductive line does not impact the aperture ratio of the LCD panel.

When the present invention is applied to the MVA LCD panel, the repairing method may cooperate with the slit of the pixel electrode. The repairing area is thus reduced, and the process time is also reduced.

When the repairing method cooperates with the slit of the pixel electrode, the process for the pixel electrode over the metal layer, such as the common line or the top electrode, can be saved. The damage to the metal layer under the pixel electrode can be prevented, and the repairing yield is also enhanced.

The conductive line, the top electrode, the data line, and the source/drain of the TFT can be formed in the same process. Without additional manufacturing process, the manufacturing costs will not be increased.

While the pixel electrode is formed, a plurality of openings is formed corresponding to the conductive line and the top electrode. The short of the pixel electrode and the conductive line or the top electrode can be prevented. The openings facilitate the laser welding step and/or the laser removing step of the repairing method.

A parasitic capacitor is disposed between the scan line and the source/drain to compensate the feed-through-voltage variation after repairing and to maintain the display quality.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A thin film transistor array substrate, comprising:
   a substrate;
   a plurality of scan lines disposed over the substrate;
   a plurality of data lines disposed over the substrate, the data lines and the scan lines defining a plurality of pixel areas on the substrate;
   a plurality of common lines disposed over the substrate, a portion of each common line being arranged in one of the pixel areas;
   a plurality of pixels disposed over the substrate, each of the pixels being disposed in one of the pixel areas and driven by one of the scan lines and one of the data lines corresponding thereto, wherein each of the pixels comprising:
      a thin film transistor coupled to the scan line and the data line corresponding thereto;
      a pixel electrode disposed over the common line corresponding thereto, and coupled to the thin film transistor;
      a top electrode disposed between the pixel electrode and the common line corresponding thereto; and
      one or more conductive lines, a terminal of each conductive line being coupled to a side of the top electrode, and another terminal of each conductive line extending out of the common line and being coupled to the pixel electrode.

2. The thin film transistor array substrate of claim 1, further comprising a passivation layer covering the thin film transistors, and being disposed between the top electrodes and the pixel electrodes.

3. The thin film transistor array substrate of claim 2, wherein each of the pixels further comprises a contact hole, the contact hole being in the passivation layer and connecting the conductive line and the pixel electrode corresponding thereto.

4. The thin film transistor array substrate of claim 3, wherein each conductive line comprises a bridge part and a contact part, the contact part connects with the contact hole corresponding thereto, and the bridge part is coupled between the contact part and the top electrode corresponding thereto.

5. The thin film transistor array substrate of claim 1, wherein each of the top electrodes comprises:
   a first top sub-electrode, a terminal of one of the conductive lines being coupled to a side of the first top sub-electrode;
   a second top sub-electrode; and
   a connection part being coupled between the first top sub-electrode and the second top sub-electrode.

6. The thin film transistor array substrate of claim 5, wherein a location of the pixel electrode corresponding to each first top sub-electrode comprises a first opening.

7. The thin film transistor array substrate of claim 5, wherein a location of the pixel electrode corresponding to each second top sub-electrode comprises a second opening.

8. The thin film transistor array substrate of claim 5, wherein a location of the common line corresponding to each connection part comprises a third opening.

9. A repairing method of a thin film transistor array substrate, adapted to repair the thin film transistor array substrate of claim 5, when a conductive residue exists between one of the first top sub-electrodes and one of the data lines so that a pixel corresponding thereto forms a defective pixel, the repairing method comprising:
   removing a portion of the connection part of the top electrode of the defective pixel so that the first top sub-electrode and the second top sub-electrode of the defective pixel are electrically isolated;
   removing a portion of the conductive line of the defective pixel so that the first top sub-electrode of the defective pixel and the pixel electrode are electrically isolated; and
   welding the second top sub-electrode of the defective pixel and the common line corresponding thereto.

10. The repairing method of the thin film transistor array substrate of claim 9, further comprising forming a third opening in the common line of the defective pixel corresponding to the connection part before removing the portion of the connection part of the top electrode of the defective pixel.

11. The repairing method of the thin film transistor array substrate of claim 9, further comprising forming a fourth opening in the pixel electrode of the defective pixel corresponding to the conductive line before removing the portion of the conductive line of the defective pixel.

12. The repairing method of the thin film transistor array substrate of claim 9, further comprising forming a second opening in the pixel electrode of the defective pixel corresponding to a location of welding before welding the second top sub-electrode of the defective pixel and the common line corresponding thereto.

13. The repairing method of the thin film transistor array substrate of claim 9, wherein a method of removing the portion of the connection part of the top electrode of the defective pixel comprises a laser removing method.

14. The repairing method of the thin film transistor array substrate of claim 9, wherein a method of removing the portion of the conductive line of the defective pixel comprises a laser removing method.

15. The repairing method of the thin film transistor array substrate of claim 9, wherein a method of welding the second top sub-electrode of the defective pixel and the common line corresponding thereto comprises a laser welding method.

16. The repairing method of the thin film transistor array substrate of claim 9, wherein each thin film transistor comprises: a gate coupled to the scan line corresponding thereto; a channel layer disposed over the gate; a source/drain disposed over the channel layer above the gate, and coupled to the data line and the pixel electrode corresponding thereto; and an extension electrode coupled to a side of the source/drain, the extension electrode extending over the scan line corresponding thereto to cooperate with the scan line to form a parasitic capacitor, the repairing method further comprising:
removing at least a portion of the extension electrode of the defective pixel to change the parasitic capacitance.

17. A repairing method of a thin film transistor array substrate, adapted to repair the thin film transistor array substrate of claim 5, when a conductive residue exists between one of the second top sub-electrodes and one of the data lines so that a pixel corresponding thereto forms a defective pixel, the repairing method comprising:
removing a portion of the connection part of the top electrode of the defective pixel so that the second top sub-electrode and the first top sub-electrode are electrically isolated.

18. The repairing method of the thin film transistor array substrate of claim 17, further comprising forming an opening in the common line of the defective pixel corresponding to the connection part before removing the portion of the connection part of the top electrode of the defective pixel.

19. The repairing method of the thin film transistor array substrate of claim 17, wherein a method of removing a portion of the connection part of the top electrode of the defective pixel comprises a laser removing method.

20. The repairing method of the thin film transistor array substrate of claim 17, wherein each thin film transistor comprises: a gate coupled to the scan line corresponding thereto; a channel layer disposed over the gate; a source/drain disposed over the channel layer above the gate, and coupled to the data line and the pixel electrode corresponding thereto; and an extension electrode coupled to a side of the source/drain, the extension electrode extending over the scan line corresponding thereto to cooperate with the scan line to form a parasitic capacitor, the repairing method further comprising:
removing at least a portion of the extension electrode of the defective pixel to change the parasitic capacitance.

21. The thin film transistor array substrate of claim 1, wherein a location of the pixel electrode corresponding to each conductive line comprises a fourth opening.

22. The thin film transistor array substrate of claim 1, wherein each pixel electrode comprises at least one slit.

23. The thin film transistor array substrate of claim 22, wherein an edge of each slit has a jag profile.

24. The thin film transistor array substrate of claim 22, wherein each conductive line is disposed between two neighboring slits, and each conductive line is parallel to the neighboring slits.

25. The thin film transistor array substrate of claim 1, wherein each thin film transistor comprises:
a gate coupled to the scan line corresponding thereto;
a channel layer disposed over the gate;
a source/drain disposed over the channel layer above the gate, and coupled to the data line and the pixel electrode corresponding thereto; and
an extension electrode coupled to a side of the source/drain, the extension electrode extending over the scan line corresponding thereto to cooperate with the scan line to form a parasitic capacitor.

26. A repairing method of a thin film transistor array substrate, adapted to repair the thin film transistor array substrate of claim 1, when a particle and/or a hole exists between one of the top electrodes and one of the common lines so that a pixel corresponding thereto forms a defective pixel, the repairing method comprising:
removing a portion of the conductive line of the defective pixel so that a top electrode and a pixel electrode of the defective pixel are electrically isolated; and
welding the top electrode of the defective pixel and the common line corresponding thereto.

27. The repairing method of the thin film transistor array substrate of claim 26, further comprising forming a first opening in the pixel electrode of the defective pixel corresponding to the conductive line before removing the portion of the conductive line of the defective pixel.

28. The repairing method of the thin film transistor array substrate of claim 26, wherein a method of removing the portion of the conductive line of the defective pixel comprises a laser removing method.

29. The repairing method of the thin film transistor array substrate of claim 26, further comprising forming a second opening in the pixel electrode of the defective pixel corresponding to a location of welding before welding the top electrode of the defective pixel and the common line corresponding thereto.

30. The repairing method of the thin film transistor array substrate of claim 26, wherein a method of welding the top electrode of the defective pixel and the common line corresponding thereto comprises a laser welding method.

31. A repairing method of a thin film transistor array substrate, adapted to repair the thin film transistor array substrate of claim 1, when a conductive residue exists between two neighboring pixel electrodes or a particle and/or a hole exists between one of the pixel electrodes and the common line corresponding thereto so that a pixel corresponding thereto forms a defective pixel, the repairing method comprising:
removing a portion of the pixel electrode of the defective pixel so that the conductive residue and the conductive line are electrically isolated.

32. The repairing method of the thin film transistor array substrate of claim 31, wherein each pixel electrode comprises at least one slit, each slit crosses over the top electrode corresponding thereto, and the conductive residue and the conductive line are electrically isolated by the step of removing the portion of the pixel electrode of the defective pixel, and the slit corresponding thereto.

33. The repairing method of the thin film transistor array substrate of claim 31, wherein a method of removing the portion of the pixel electrode of the defective pixel comprises a laser removing method.

34. The repairing method of the thin film transistor array substrate of claim 31, wherein each thin film transistor comprises: a gate coupled to the scan line corresponding thereto; a channel layer disposed over the gate; a source/drain disposed over the channel layer above the gate, and coupled to the data line and the pixel electrode corresponding thereto; and an extension electrode coupled to a side of the source/drain, the extension electrode extending over the scan line corresponding thereto to cooperate with the scan line to form a parasitic capacitor, the repairing method further comprising:

removing at least a portion of the extension electrode of the defective pixel to change the parasitic capacitance.

* * * * *